Jan. 10, 1939.   E. L. C. WHITE   2,143,397
GENERATOR OF ELECTRICAL OSCILLATIONS
Filed March 21, 1936    3 Sheets-Sheet 1

INVENTOR
E. L. C. WHITE
BY
ATTORNEY

Jan. 10, 1939.     E. L. C. WHITE     2,143,397
GENERATOR OF ELECTRICAL OSCILLATIONS
Filed March 21, 1936     3 Sheets-Sheet 2

INVENTOR
E. L. C. WHITE
BY
H. S. Grover
ATTORNEY

Jan. 10, 1939.   E. L. C. WHITE   2,143,397
GENERATOR OF ELECTRICAL OSCILLATIONS
Filed March 21, 1936   3 Sheets-Sheet 3
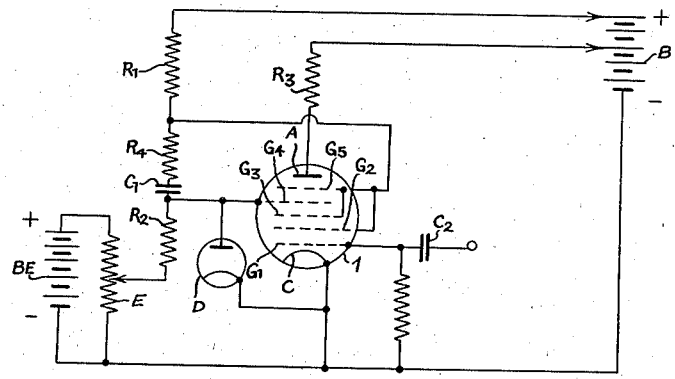
Fig. 6.
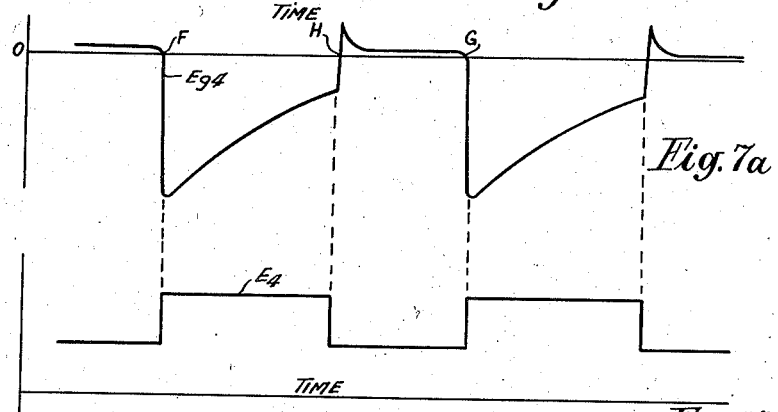
Fig. 7a.
Fig. 7b.
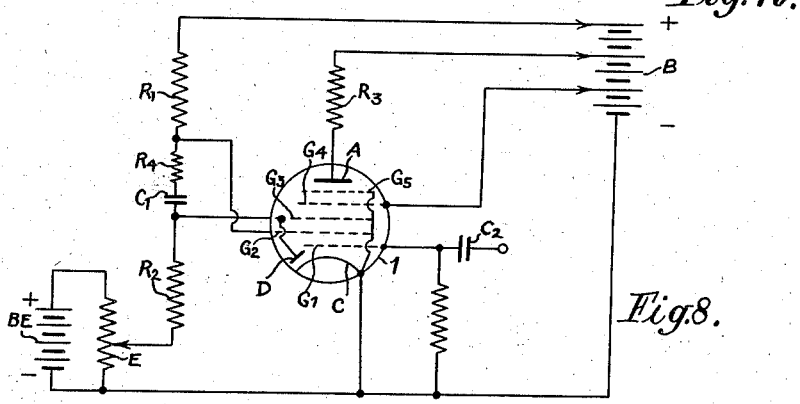
Fig. 8.
INVENTOR
E. L. C. WHITE
BY
ATTORNEY Patented Jan. 10, 1939

2,143,397

UNITED STATES PATENT OFFICE 2,143,397

GENERATOR OF ELECTRICAL OSCILLATIONS

Eric Lawrence Casling White, Hillingdon, England, assignor to Electric & Musical Industries Limited, Middlesex, England, a British company Application March 21, 1936, Serial No. 70,025
In Great Britain March 21, 1935

7 Claims. (Cl. 250—36)

The present invention relates to generators of electrical oscillations, and is particularly concerned with generators of the kind known as relaxation oscillators. For the purpose of this specification, a multivibrator will be regarded as a form of relaxation oscillator.

Figure 1:
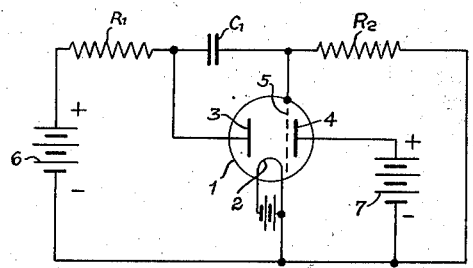
Figure 2:
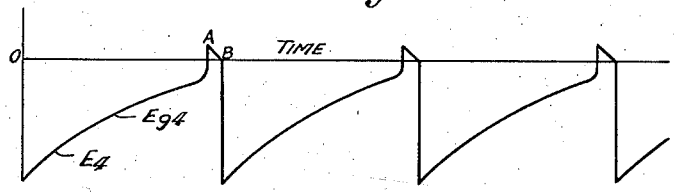
Figure 3:
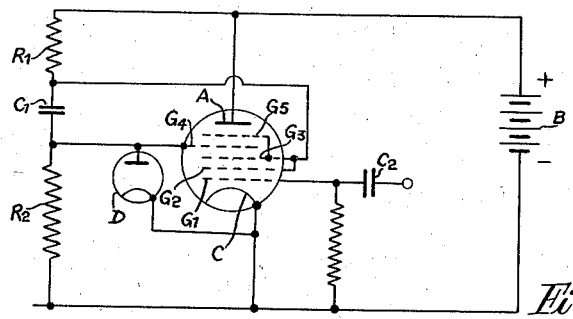
Figure 4:
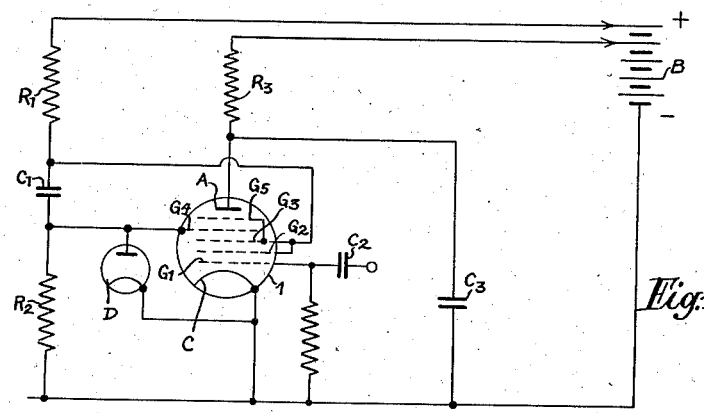
Figure 5:
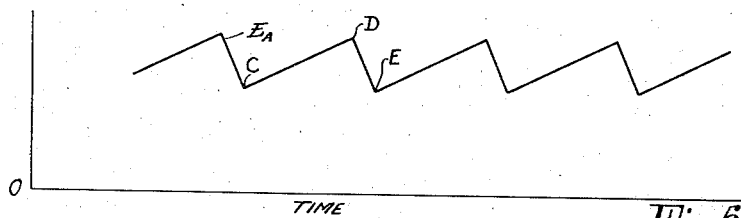

My invention will best be understood by reference to the accompanying drawings, in which Fig. 1 shows an arrangement of the prior art, Fig. 2 is an explanatory curve, Figs. 3 and 4 are diagrammatic representations of various oscillators according to the invention, Fig. 5 is an explanatory curve, Fig. 6 is a diagrammatic oscillator according to the invention, Figs. 7a and 7b are explanatory curves, and Fig. 8 is a diagrammatic representation of an oscillator according to the invention.

Figure 9:
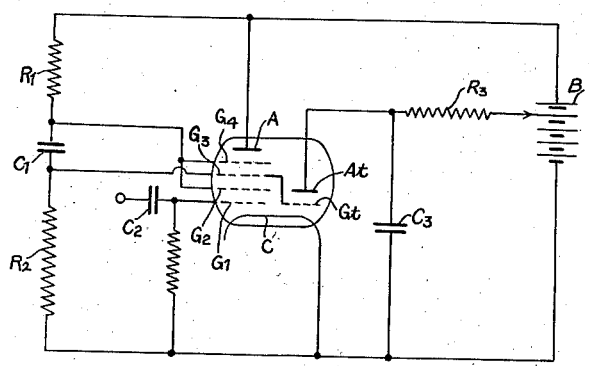

Fig. 9 is a still further embodiment of my invention.

It is known that relaxation oscillations can be produced by means such as are shown in Fig. 1 of the drawings accompanying this specification; the arrangement shown comprises a single thermionic valve 1 having a cathode 2, two separate anode electrodes 3 and 4 and a grid electrode 5 for controlling the flow of current to the anode 4. The anode 3, the current to which is not controlled by the grid, is connected to a source of anode current 6 through a resistance $R_1$, and to the grid through a condenser $C_1$; a grid leak $R_2$ is also provided. The anode 4 is connected to a suitable source of current 7. It is arranged that the total current to the two anodes is constant, and this is achieved by employing a bright-emitting cathode, such as a tungsten filament, and operating the valve 1 in a condition of anode current saturation.

In the arrangement shown in Fig. 1, let it be assumed that there is applied to the grid 5 an impulse tending to make the grid more negative; the current to the anode 4 is decreased, and more current accordingly flows to the anode 3. The increase in the current passing through resistance $R_1$ causes the potential at the anode 3 to fall, and, as a result of this fall of potential, the right hand side of condenser $C_1$ takes up a negative charge so that the initial negative grid potential is increased. This action is cumulative, and continues until the rate of decrease of the potential of the anode 3 is equal to the rate at which the charge on $C_1$ leaks away through resistance $R_2$, this condition being reached when the grid potential is much more negative than the potential at which substantial current ceases to flow to the anode 4.

The charge on $C_1$ now leaks away relatively slowly until the grid reaches the potential at which the anode 4 again begins to take current; the current to the anode 3 now commences to decrease relatively rapidly, and the potential at the anode 3 rises, the effect of this increase of potential being to drive the grid in the positive direction and after a short time, to give the right hand side of condenser $C_1$ a positive charge. When the grid becomes positive relative to the cathode, however, electrons flow to the grid from the cathode, the positive charge on condenser $C_1$ is neutralized, and the grid once more tends to become negative, thus completing the cycle.

Provided suitable values of components, electrode voltages, etc. are employed, the circuit of Fig. 1 generates relaxation oscillations, the wave form of the potential of the grid being as shown in Fig. 2 of the drawings accompanying this specification, grid potentials being plotted as ordinates against time as abscissa. The period of the oscillation is governed by the value of the time constant $C_1R_2$, since $R_1$ is generally negligibly small compared with $R_2$. The part AB of the curve of Fig. 2 represents the part of the cycle during which current is flowing between the grid and the cathode.

The usefulness of oscillators of the kind described with reference to Figs. 1 and 2 is found to be somewhat limited, more especially if it is desired to control the frequency of the oscillation generated in accordance with a controlling oscillation; for example, such oscillators are not well adapted for use as frequency dividers.

It is an object of the present invention to provide improved oscillation generators of the kind described above, which are not only more reliable in operation, but which are also adapted to be controlled by an applied oscillation.

The present invention accordingly provides an electric oscillation generator comprising a thermionic valve having a cathode, an anode and, arranged in the electron path between the cathode and the anode in the order named, a first grid and a second grid, in which there are provided means for maintaining the first grid and the anode at positive potentials relative to the cathode, an impedance element arranged to be traversed by the current to the first grid and means for causing variations in the potential of the first grid to vary the potential of the second grid, the arrangement being characterized in that limiting means are provided for preventing the potential of said second grid from assuming a potential substantially greater than that of the cathode.

The valve may include a third grid which may be used for the introduction of controlling oscillations; the means by which variations in the potential of the first grid are caused to vary the potential of the second grid preferably take the form of a condenser, the latter being provided with a leak resistance. Other features of the invention will appear hereinafter.

Like parts in Figs. 3, 4, 6 and 8 are given the same reference characters.

Referring to Fig. 3, a relaxation oscillator comprises a heptode valve 1 of standard type having a cathode C, an anode A and five grids $G_1$ to $G_5$. The grid $G_3$ is connected through a resistance $R_1$ to the positive pole of a source of current B, and the anode is connected directly to the positive pole of the source.

The grid $G_3$ is also connected through a condenser $C_1$ to the grid $G_4$, which is connected to the cathode C through a leak resistance $R_2$. The grid $G_3$ is maintained at a positive potential relative to the cathode. The grid $G_5$ is in standard valves usually connected within the valve to grid $G_3$, and the fact that the two grids are thus held at the same potential has been found not to affect materially the operation of the device; as will be shown hereinafter, grid $G_1$ may be employed for the introduction of controlling impulses, and the grid $G_2$ serves no separate function and is conveniently connected to grid $G_3$.

The operation of the arrangement shown in Fig. 3 is substantially the same as that of the oscillator of Fig. 1; the grids $G_3$ and $G_4$ correspond to anode 3 and grid 5 of Fig. 1 and anode A corresponds to the anode 4. The cycle of oscillation of the potential of the grid $G_4$ is as shown in Fig. 2, and electrons flow from the cathode C to the grid $G_4$ during the part AB of the cycle so as to dissipate the positive charge on the condenser $C_1$ and to cause grid $G_4$ to become negative once more.

It is found that if the grid $G_4$ is allowed to become more than a few volts positive relative to the cathode a negative resistance effect manifests itself and the arrangement ceases to oscillate in the manner described with reference to Fig. 2; in order, therefore, to prevent the potential of grid $G_4$ from reaching such a positive potential, a uni-directionally conducting device D, such as a diode valve, is connected between the grid $G_4$ and the cathode C, the anode of the device D being connected to the grid $G_4$ and the cathode thereof being connected to the cathode C.

As has been stated, the frequency of the oscillation generated may be controlled in accordance with signals applied to grid $G_1$. If the natural frequency of the oscillator is made slightly less than a desired frequency, and negative voltage impulses of this desired frequency are applied to grid $G_1$, for example through condenser $C_2$, the oscillator will be held in synchronism at the desired frequency. Controlling impulses in suitable sense may, if desired, be fed to an electrode other than grid $G_1$, in which case grid $G_1$ may be omitted.

An advantage of the arrangement shown in Fig. 3 over that shown in Fig. 1 is that owing to the presence of the positively charged grid $G_5$, the current to the anode A is substantially independent of the potential of the anode, provided that the anode potential never falls below the potential of grid 5. The anode A may thus conveniently be associated with an output circuit without disturbing the operation of the oscillator. If a sixth grid (not shown) is provided between A and $G_5$, and this sixth grid is connected to the cathode, the anode potential may be allowed to fall below the potential of grid 5 without appreciably affecting the anode current.

Fig. 4 shows the application of an oscillator of the kind shown in Fig. 3 to the generation of oscillations of saw-tooth wave form of the kind shown in Fig. 5. In Fig. 5 anode potentials are plotted against time as abscissa. Referring to Fig. 4, the anode A is connected through a resistance $R_3$ to a point at a suitable positive potential in the source B, and to the cathode C through a condenser $C_3$. When the charge on the condenser $C_1$ is such that grid $G_4$ is so highly negative that substantially no current can flow to the anode A, the condenser $C_3$ charges up through the resistance $R_3$. The charging curve may be made substantially rectilinear, as shown by the part CD of the curve of Fig. 5.

The connections not mentioned herein as regards Figs. 4, 6 and 8 are similar to those set forth in Fig. 3.

During the time in which current flows to the anode A (that is, during an interval corresponding to the interval AB in Fig. 2) the condenser $C_3$ is discharged relatively rapidly through the anode—cathode path of the valve 1, as shown by the part DE of the curve of Fig. 5. By suitably choosing the circuit constants, the condenser $C_3$ may be arranged to be discharged substantially completely if desired. The current to the anode A is then again interrupted, condenser $C_3$ commences to charge up, and the cycle recommences. There is thus set up across the condenser $C_3$ a voltage oscillation of saw-tooth wave form, the oscillation being suitable for use, for example, as a scanning oscillation in a television system.

An important advantage of the arrangement of Fig. 4 is that the frequency of the saw-tooth oscillation generated can be controlled by suitable controlling signals applied to grid $G_1$ through condenser $C_2$.

The natural frequency of the oscillator shown in Figs. 3 and 4 is dependent upon the time constant $C_1R_2$, and can conveniently be adjusted by varying the value of resistance $R_2$. It should also be noted that the frequency of the oscillation generated can be controlled by impulses in the positive sense applied to grid $G_3$ or grid $G_4$, instead of by negative impulses applied to $G_1$.

In the modification of the arrangement of Fig. 3 which is shown in Fig. 6, a resistance $R_4$ is connected in series with the condenser $C_1$ between grids $G_3$ and $G_4$, and the lower end of resistance $R_2$ is connected to a tapping point, at a positive potential which is substantially less than that of grid $G_3$, in a potential divider E; the latter is shunted across a source of current BE. The anode A is connected to a point at a positive potential in the source B through a resistance $R_3$.

The circuit of Fig. 6 has one condition in which it will remain quasi-permanently in equilibrium; this is the condition in which current is flowing in resistance $R_2$ and the diode D due to the potential difference between the tapping point in potential divider E and the negative terminal of battery BE. In this condition, the diode D has a low impedance; changes in the potential difference between grid $G_3$ and the cathode C are applied across $R_4$, $C_1$ and the diode D, these three elements being in series with one another and constituting a potential divider, and it will be clear that if the impedance of the diode D is only a small fraction of the impedance of the whole potential divider $R_4$, $C_1$, D, changes in the potential of grid $G_4$ in response to changes in the potential of grid $G_3$ will be small as compared to the corresponding changes in the case of the circuit of Fig. 3, for example. The circuit thus has a stable condition.

Assuming the circuit to be in this stable condition, let a voltage impulse in the positive sense be applied to grid $G_1$; if this impulse is of sufficient amplitude, the grid $G_4$ will be driven negative relative to the cathode C, and the diode D will cease to conduct. That is to say, the circuit "kicks" over into the condition in which the grid $G_4$ has such a high negative potential that current ceases to flow to the anode A.

The negative potential on the grid $G_4$ is slowly neutralized through the leak $R_2$, and after a time current again commences to flow to the anode. The circuit now "kicks" over into the stable condition, in which it remains until another controlling impulse arrives at the grid $G_1$.

The wave form of the potential of Grid $G_4$ over a number of cycles of oscillation is shown in Fig. 7a, in which grid potential is plotted against time as abscissa. Controlling impulses arrive at the points F and G, and the time interval FH is dependent upon the time constant $C_1R_2$ and upon the potential at the tapping point in E, both of which may be varied as required.

The wave form of the potential at the anode is shown in Fig. 7b, in which anode potential is plotted against time as abscissa. It will be seen that square-topped pulses of the same form as those generated by a multivibrator are produced at the anode, and the circuit may in fact be regarded as a form of multivibrator.

It will be seen that if the time interval FH is greater than the period of the controlling impulses, but less than twice this period, alternate impulses produce no effect, and the frequency of the pulses in the anode circuit will be one half of the frequency of the controlling impulses. The arrangement thus operates as a frequency divider, and by suitably choosing the time interval FH, may be made to have any integral factor of division within a wide range.

The arrangement of Fig. 6 which is capable of producing uni-directional pulses of controllable width and of providing reliable frequency division, has many applications in the television field for example.

Fig. 8 shows a modification of the arrangement shown in Fig. 6. The grid $G_1$ is employed for introducing controlling impulses, grids $G_2$ and $G_3$ take the place of grids $G_3$ and $G_4$ of Figs. 3, 4 and 6, $G_4$ is connected to a tapping point in the source B, and a fifth grid $G_5$, is connected directly to the cathode C. A separate anode D co-operates with the cathode C and forms therewith a diode which takes the place of the diode D in Fig. 6. It is preferably arranged that the curve relating the potential of grid $G_3$ and the anode current is as straight as possible. The fifth grid $G_5$, although not essential, is a desirable feature since it allows the anode potential to fall to a low value without upsetting the operation.

Fig. 9 shows a modification of the arrangement shown in Fig. 4 in which a valve of the triode-hexode type replaces the diode D and heptode valve 1 of the arrangement of Fig. 4. Referring to Fig. 9, the grid $G_1$ is arranged to have controlling impulses applied to it through condenser $C_2$, grids $G_2$ and $G_4$ are connected together and through a resistance $R_1$ to the positive terminal of source B, the hexode anode A is connected directly to the positive terminal of source B and grid $G_3$ is connected to the cathode C through resistance $R_2$. Grids $G_2$ and $G_3$ are coupled together through condenser $C_1$.

The triode grid $G_t$ takes the place of the anode of diode D of Fig. 4, and the triode anode $A_t$ is connected through condenser $C_3$ to the cathode C, and through resistance $R_3$ to a suitable point in source B. Grids $G_3$ and $G_t$ are connected together within the valve.

The arrangement shown in Fig. 9 provides a saw-tooth oscillation across condenser $C_3$; controlling pulses in the negative sense are fed to grid $G_1$, and it is found that quite a small pulse amplitude, for example about 0.5 volt, is satisfactory to drive the device. Generators of the kind shown in Fig. 6 may also comprise a triode-hexode valve.

A number of generators of the kind shown in Figs. 3, 6 or 8 may be connected in cascade to provide frequency division by large integers, each generator being arranged to divide the frequency of applied oscillations by a suitable sub-multiple of the factor of division of the whole apparatus. In such arrangements, pulses set up at the anode A of each generator are fed to the first grid, $G_1$, of the next. The arrangement shown in Fig. 9 may be adapted for use as a frequency divider by emitting condenser $C_3$; a plurality of these generators, so modified may also be connected in cascade.

It must be understood that the arrangements described with reference to Figs. 3 to 9 have been given by way of example only, and the invention is not limited thereto; many modifications within the scope of the invention, as set forth in the appended claims, will occur to those versed in the art.

I claim:

1. An electric oscillation generator comprising a thermionic valve having a cathode for emitting a stream of electrons, an anode for receiving said stream and, arranged in said stream in the order named, a first grid and a second grid, a source of potential difference for maintaining said first grid and said anode at positive potentials relative to said cathode, an impedance element connected between said first grid and a point at a positive potential in said source, means for causing variations in the potential of said first grid to vary the potential of said second grid and limiting means comprising a diode for preventing the potential of said second grid from assuming a value substantially greater than that of said cathode.

2. An electric oscillation generator comprising a thermionic valve having a cathode for emitting a stream of electrons, an anode for receiving said stream and, arranged in said stream in the order named, a first grid and a second grid, a source of potential difference for maintaining said first grid and said anode at positive potentials relative to said cathode, an impedance element connected between said first grid and a point at a positive potential in said source, a condenser connected between said first and second grids, means for permitting charges accumulated by said condenser to leak away and limiting means comprising a diode for preventing the potential of said second grid from assuming a value substantially greater than that of said cathode.

3. A generator according to claim 2, wherein a resistance is arranged in series with said condenser between said first and second grids.

4. A generator according to claim 1, wherein there is provided a source of bias potential having its negative terminal connected to the cathode of said valve, said second grid being connected to a point in said source at a potential which is positive with respect to said cathode and negative with respect to said first grid.

5. An electric oscillation generator comprising a thermionic valve having a cathode for emitting a stream of electrons, an anode for receiving said stream and, arranged in said stream in the order named, a first grid, a second grid, a screen grid means for positively biasing said screen grid with respect to the cathode, a source of potential difference for maintaining said first grid and said anode at positive potentials relative to said cathode, an impedance element connected between said first grid and a point at a positive potential in said source and means for causing variations in the potential of said first grid to vary the potential of said second grid, means comprising a diode for maintaining said second grid at a potential lower than the cathode.

6. An electric oscillation generator comprising a thermionic valve having a cathode for emitting a stream of electrons, an anode for receiving said stream and, arranged in said stream in the order named, a first grid and a second grid, a source of potential difference for maintaining said first grid and said anode at positive potentials relative to said cathode, an impedance element connected between said first grid and a point at a positive potential in said source, means for causing variations in the potential of said first grid to vary the potential of said second grid and limiting means comprising a diode for preventing the potential of said second grid from assuming a value substantially greater than that of said cathode, an electric storage element connected in the anode-cathode path of said valve, and a series electric circuit comprising said electric storage element, a resistance, and a source of potential.

7. An electric oscillation generator comprising a thermionic valve having a cathode for emitting a stream of electrons, an anode for receiving said stream, a first grid, a second grid, said grids being located in said electron stream in the order named, a source of potential difference for maintaining said first grid and said anode at positive potentials relative to said cathode, an impedance element connected between said first grid and a point at a positive potential in said source, a second impedance element connected between said second grid and the cathode, means for causing variations in the potential of said first grid to vary the potential of said second grid, a unidirectional conductive device having a cathode and an anode, a connection between the anode of said unidirectional conductive device and both the second grid and the second impedance element, and a connection between the cathode of said device and the cathode of said thermionic valve, said latter connections serving to prevent the potential of the second grid from assuming a value substantially greater than that of the cathode.

ERIC LAWRENCE CASLING WHITE.